(12) United States Patent
Bae et al.

(10) Patent No.: US 8,325,380 B2
(45) Date of Patent: Dec. 4, 2012

(54) PRINTING METHOD OF PRINTING AN IMAGE BASED ON THE POSITION OF A FACE AREA DETECTED ON THE IMAGE, A PHOTO-PRINTING SYSTEM AND DIGITAL CAMERA ADAPTED TO THE METHOD

(75) Inventors: Sung-cheol Bae, Changwon (KR); Won-jung Kim, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1136 days.

(21) Appl. No.: 12/228,412

(22) Filed: Aug. 12, 2008

(65) Prior Publication Data
US 2009/0044714 A1   Feb. 19, 2009

(30) Foreign Application Priority Data

Aug. 17, 2007   (KR) .................. 10-2007-0083004
Jun. 17, 2008    (KR) .................. 10-2008-0057017

(51) Int. Cl.
G06K 15/02   (2006.01)
G06K 15/00   (2006.01)
G06K 9/32    (2006.01)
H04N 1/21    (2006.01)

(52) U.S. Cl. ........ 358/1.2; 358/3.11; 358/3.12; 358/302; 382/298

(58) Field of Classification Search .................. 358/1.2, 358/1.12, 2.1, 3.02, 3.06, 3.09, 3.11, 3.12, 358/3.32, 527; 382/298; 355/40, 41; 345/620
See application file for complete search history.

(56) References Cited

U.S. PATENT DOCUMENTS

| 7,643,704 | B2 * | 1/2010 | Jackson et al. | 382/298 |
| 2001/0048447 | A1 * | 12/2001 | Jogo | 345/620 |
| 2005/0025387 | A1 * | 2/2005 | Luo | 382/298 |

(Continued)

FOREIGN PATENT DOCUMENTS

CN   1422070 A   6/2003

(Continued)

OTHER PUBLICATIONS

Notice of Allowance established for KR 10-2008-0057017 (Jun. 3, 2011).

(Continued)

Primary Examiner — Benny Q Tieu
Assistant Examiner — Ngon Nguyen
(74) Attorney, Agent, or Firm — Drinker Biddle & Reath LLP

(57) ABSTRACT

A method of printing an image and a photo printing system and a digital camera adapted for the printing method are provided. The method of printing an image is a printing method for outputting through a photo printer an image stored in an image storage device. The method includes: setting a temporary printing area on an image to be printed; determining whether or not an option for Paper-full printing in which no space is left on a printing material, is selected; if the Paper-full print option is selected, detecting a face area photographed on the image; determining whether or not the detected face area is included in a printing area; and according to the determination result, adjusting a printing area so that the face area can be included in the printing area.

6 Claims, 16 Drawing Sheets

U.S. PATENT DOCUMENTS

| | | |
|---|---|---|
| 2005/0088694 A1 | 4/2005 | Ogiwara |
| 2007/0071319 A1 | 3/2007 | Fukushima |
| 2007/0103729 A1 | 5/2007 | Yoda et al. |

FOREIGN PATENT DOCUMENTS

| | | |
|---|---|---|
| EP | 1 558 015 A1 | 7/2005 |
| GB | 2 412 529 A | 9/2005 |
| JP | 11-308470 A | 11/1999 |
| JP | 2007-235686 A | 9/2007 |
| JP | 2007-241793 A | 9/2007 |
| KR | 1020050033537 A | 4/2005 |
| KR | 1020050090291 A | 9/2005 |
| KR | 100648017 B1 | 11/2006 |
| KR | 1020070034973 A | 3/2007 |

OTHER PUBLICATIONS

Examination Report established for GB 0814653.2 (Mar. 22, 2012).

* cited by examiner

FIG. 5

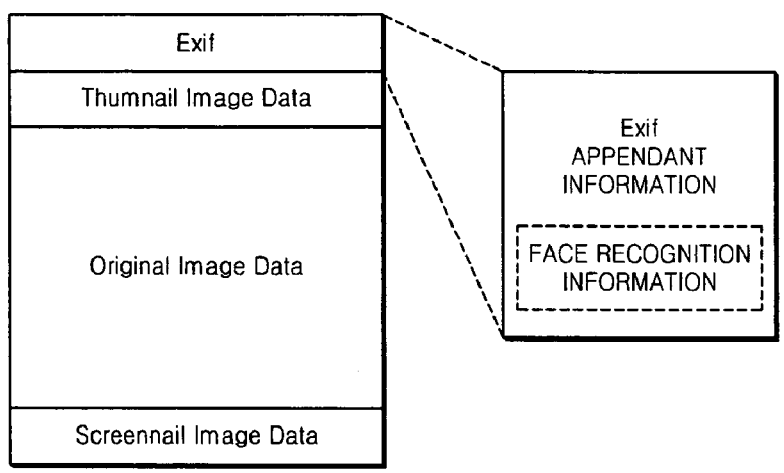

FIG. 6

| FACTOR NAME | FACTOR VALUE | DESCRIPTION |
|---|---|---|
| Face_Num | 2 | THE NUMBER OF FACES EXISTING IN CURRENT IMAGE |
| Face_Start_Pt | (X1, Y1) | X1: X COORDINATE OF STARTING POINT OF FACE<br>Y1: Y COORDINATE OF STARTING POINT OF FACE |
| Face_Size | (A1, B1) | A1: WIDTH OF FACE<br>B1: LENGTH OF FACE |
| Face_Name | John | NAME OF FACE |
| Face_Mobile_Num | 010 000 0000 | MOBILE PHONE NUMBER OF FACE |
| Face_EMail_Addr | email@-- | EMAIL ADDRESS OF FACE |
| Face_XXXX | - | - |
| - | - | - |
| Face_Start_Pt | (X2, Y2) | - |
| Face_Size | (A2, B2) | - |
| Face_Name | Anne | - |
| - | - | - |
| - | - | - |
| - | - | - |

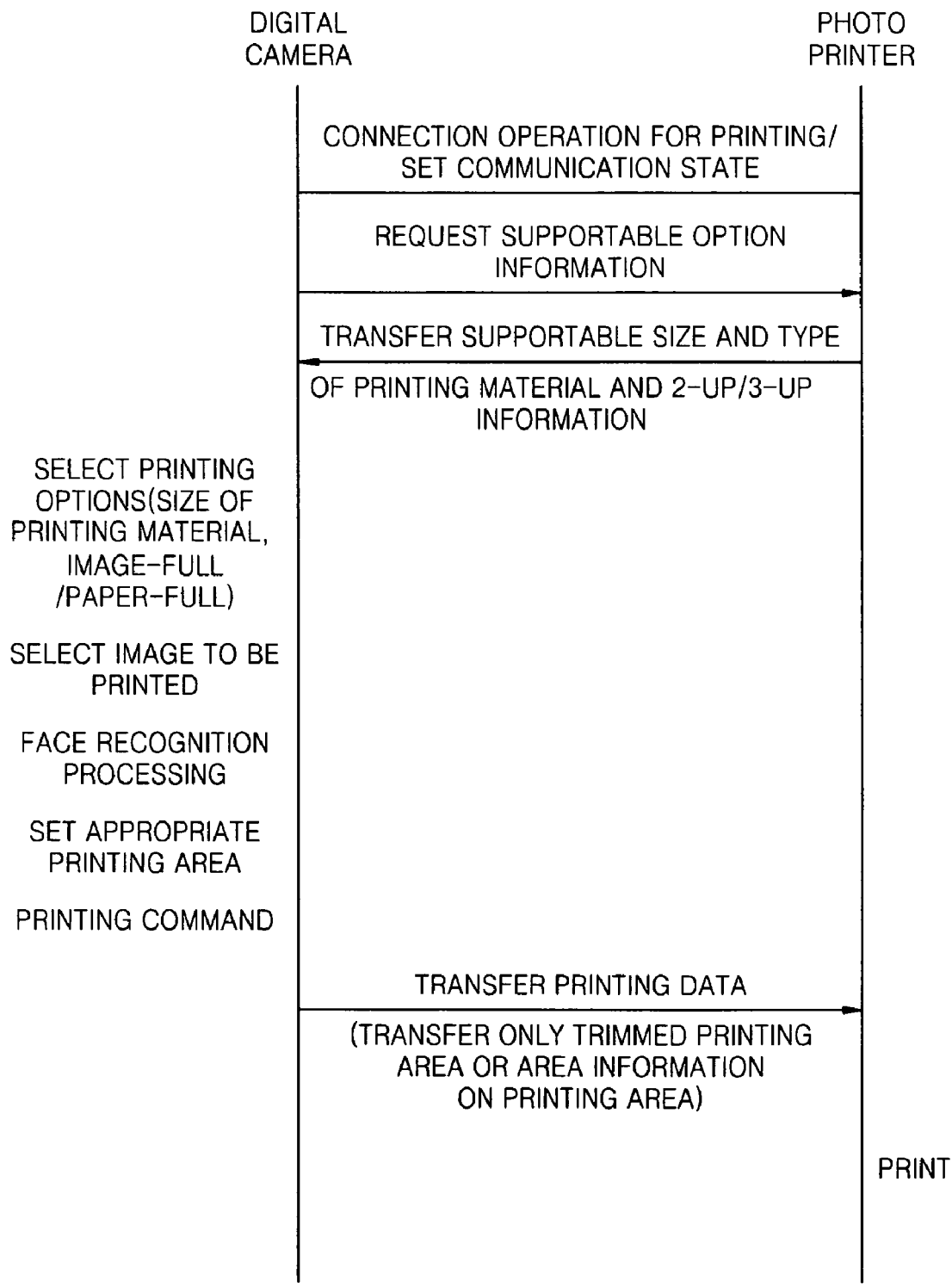

PRINTING METHOD OF PRINTING AN IMAGE BASED ON THE POSITION OF A FACE AREA DETECTED ON THE IMAGE, A PHOTO-PRINTING SYSTEM AND DIGITAL CAMERA ADAPTED TO THE METHOD

CROSS-REFERENCE TO RELATED PATENT APPLICATIONS

This application claims the benefit of Korean Patent Application No. 10-2007-0083004, filed on Aug. 17, 2007, and Korean Patent Application No. 10-2008-0057017, filed on Jun. 17, 2008, in the Korean Intellectual Property Office, the entire contents of each of which are incorporated herein by reference.

BACKGROUND OF THE INVENTION

1. Field of the Invention

The present invention relates to a method of printing an image, a photo printing system and a digital camera adapted for the same. More particularly, the present invention relates to a method of printing an image, by which a printing area can be variably set based on the position of a face area detected on the image such that the face area existing on the image can be printed without being cut off due to mismatch between the aspect ratio of the image to be printed and a standard size of a printing material, and a photo printing system and a digital camera adapted to the method.

2. Description of the Related Art

Recently, by applying printing technologies such as ink jet methods, dye sublimation transfer methods, and direct thermal methods, photo printers for printing images taken by cameras have been commercialized. However, while an image having a 4:3 aspect ratio is generally used by cameras or personal computers (PC), photo printers generally support printing material having a 3:2 aspect ratio. Accordingly, when an image having a 4:3 aspect ratio taken by a camera or the like is output on a sheet of 3:2 printing material, cutoff of the image or big spaces occur due to mismatch between the image and the printing material.

Meanwhile, options for printing an image on a printing material are broadly broken down into two types. One is Image-full printing and the other is Paper-full printing. The Image-full printing is a printing method by which an image is printed such that at least some edges of an image have spaces. Meanwhile, in the Paper-full printing is a printing method leaving no spaces on the printing material. In the Paper-full printing method, image information of the top and bottom or the left and right ends of an image is cut off due to mismatch between the aspect ratios of the image and a printing material. In particular, the face image of a person photographed on an image may be cut off against the will of the user.

SUMMARY OF THE INVENTION

The present invention provides a method of printing an image, by which a printing area can be variably set based on the position of a face area detected on the image such that the face image existing on the image can be printed without being cut off due to mismatch between the aspect ratio of the image which is an item for printing and a standard size of a printing material, and a photo printing system and a digital camera adapted to the method.

According to an embodiment of the present invention, there is provided a method of outputting through a photo printer an image stored in a data storage device. The method includes: setting a temporary printing area on an image to be printed; determining whether or not an option for Paper-full printing is selected; if the Paper-full print option is selected, detecting a face area on the image; determining whether or not the detected face area is included in a printing area; and according to the determination result, adjusting a printing area so that the face area can be included in the printing area.

The adjusting of the printing area may include: determining whether or not the aspect ratio of the image and the aspect ratio of the printing material are substantially different from each other; and moving the printing area according to the determination result.

In the moving of the printing area, if the aspect ratio of the image is less than the aspect ratio of the printing material, the printing area may be moved upwards or downwards, and if the aspect ratio of the image is greater than the aspect ratio of the printing material, and if a face area in only one of the left and right sides on the image exists outside the printing area, the printing area may be moved in a left or right side direction such that the face area is included in the printing area, and if the aspect ratio of the image is greater than the aspect ratio of the printing material, and if a first face area and a second face area on the left and right sides of the image exist outside the printing area, an area which is excluded from printing may be displayed for a user with a warning message.

In the moving upwards or downwards of the printing area, the printing area may be moved upwards so that the top end of the printing area matches with a second vertical height (Py2) obtained from a first vertical height (Py1) of the eye area in the face area detected from the image, the distance (h1) between the eye area and the mouth area, and a weight (α), wherein $$Py2 = Py1 + h1 \times \alpha.$$

In the moving of the printing area to the left or right, the printing area may be moved to the side where the face area exists outside the printing area.

In the displaying of the warning message to the user, a printing area may be set according to an input by the user.

In the detecting of a face area, information on the position of a face area may be extracted and read from Exif information appendant to the image, or the face area may be extracted through image processing.

According to another embodiment of the present invention, there is provided a system comprising an image storage device and an output device and printing an image received from the image storage device. The image storage device includes: a face area extraction unit detecting a face area existing on an image; a printing area appropriateness determination unit determining whether or not a detected face area is included in a printing area; and a controller adjusting the printing area so that a face area can be included according to an output of the printing area appropriateness determination unit.

The system may further include an image/material aspect ratio comparison unit comparing the aspect ratio of the image and the aspect ratio of the printing material, wherein the controller adjusts the printing area based on an output of the image/material aspect ratio comparison unit.

If the aspect ratio of the image is less than the aspect ratio of the printing material, the controller may move the printing area upwards or downwards, and if the aspect ratio of the image is greater than the aspect ratio of the printing material, and if a face area in only one of the left and right sides of the image exists outside the printing area, the controller may move the printing area in a left or right side direction such that the face area is included in the printing area, and if the aspect ratio of the image is greater than the aspect ratio of the printing material, and if a first face area and a second face area on the left and right sides of the image exist outside the printing area, the controller may display an area which is excluded from printing with a warning message.

The output device may be a photo printer, and the image storage device may be a digital camera which has a structure for capturing an image of a subject and storing the captured image as image data and transfers the stored image to the photo printer.

The output device may be a photo kiosk which is installed at a public place and provides a printing service, and the image storage device may be a user's terminal which transmits the stored image to the photo kiosk through an Internet communication network.

The output device may be a photo kiosk which is installed at a public place and provides a printing service, and the image storage device may be a web server which transmits the image that has been uploaded and stored by a user to the photo kiosk through an Internet communication network.

According to another embodiment of the present invention, there is provided a system including an image storage device and an output device and printing data received from the image storage device. The output device includes: a face area extraction unit detecting a face area existing on an image; a printing area appropriateness determination unit determining whether or not a detected face area is included in a printing area; and a controller adjusting the printing area so that a face area can be included according to an output of the printing area appropriateness determination unit.

The system may further include an image/material aspect ratio comparison unit comparing the aspect ratio of the image and the aspect ratio of the printing material, wherein the controller adjusts the printing area based on an output of the image/material aspect ratio comparison unit.

If the aspect ratio of the image is less than the aspect ratio of the printing material, the controller may move the printing area upwards or downwards, and if the aspect ratio of the image is greater than the aspect ratio of the printing material, and if a face area in only one of the left and right sides on the image exists outside the printing area, the controller may move the printing area in a left or right side direction such that the face area is included in the printing area, and if the aspect ratio of the image is greater than the aspect ratio of the printing material, and if a first face area and a second face area on the left and right sides of the image exist outside the printing area, the controller may display an area which is excluded from printing with a warning message.

The output device may be a photo printer, and the image storage device may be a digital camera which has a structure for capturing an image of a subject and storing the captured image as image data and transfers the stored image to the photo printer.

The output device may be a photo printer, and the image storage device may be a small memory device which is connected to the photo printer and transmits the stored image to the photo printer.

The output device may be a photo kiosk which is installed at a public place and provides a printing service, and the image storage device may be a user's terminal which transmits the stored image to the photo kiosk through an Internet communication network.

The output device may be a photo kiosk which is installed at a public place and provides a printing service, and the image storage device may be a web server which transmits the image that has been uploaded and stored by a user to the photo kiosk through an Internet communication network.

The output device may be a photo kiosk which is installed at a public place and provides a printing service, and the image storage device may be a portable detachable memory which is connected to the photo kiosk and transmits the stored image to the photo kiosk.

According to another embodiment of the present invention, there is provided a digital camera transmitting an image stored for a printing job to an output device and adjusting a printing area so that a face area captured on the image cannot be cut off. The digital camera includes: a face area extraction unit detecting a face area existing on an image; a printing area appropriateness determination unit determining whether or not a detected face area is included in a printing area; and a controller adjusting the printing area so that a face area can be included according to an output of the printing area appropriateness determination unit.

The digital camera may further include an image/material aspect ratio comparison unit comparing the aspect ratio of the image and the aspect ratio of the printing material, wherein the controller adjusts the printing area based on an output of the image/material aspect ratio comparison unit.

If the aspect ratio of the image is less than the aspect ratio of the printing material, the controller may move the printing area upwards or downwards, and if the aspect ratio of the image is greater than the aspect ratio of the printing material, and if a face area in only one of the left and right sides of the image exists outside the printing area, the controller may move the printing area in a left or right side direction such that the face area is included in the printing area; and if the aspect ratio of the image is greater than the aspect ratio of the printing material, and if a first face area and a second face area on the left and right sides of the image exist outside the printing area, the controller may display an area which is excluded from printing with a warning message.

BRIEF DESCRIPTION OF THE DRAWINGS

The above and other features and advantages of the present invention will become more apparent by describing in detail exemplary embodiments thereof with reference to the attached drawings in which:

FIG. 5 is a diagram illustrating an example of a data structure of image data in a Joint Photographic Experts Group (JPEG) file format according to an embodiment of the present invention;

FIG. 6 is a diagram illustrating an example of a data structure of face recognition information included in Exchangeable image file format (Exif) appendant information according to an embodiment of the present invention;

FIG. 7 schematically illustrates an example of the detail of communication between the photo printing system and a digital camera, which are illustrated in FIG. 1, according to an embodiment of the present invention;

DETAILED DESCRIPTION OF THE INVENTION

A method of printing an image and a photo printing system and a digital camera adapted to the method according to the present invention will now be described more fully with reference to the accompanying drawings, in which exemplary embodiments of the invention are shown.

Figure 1:
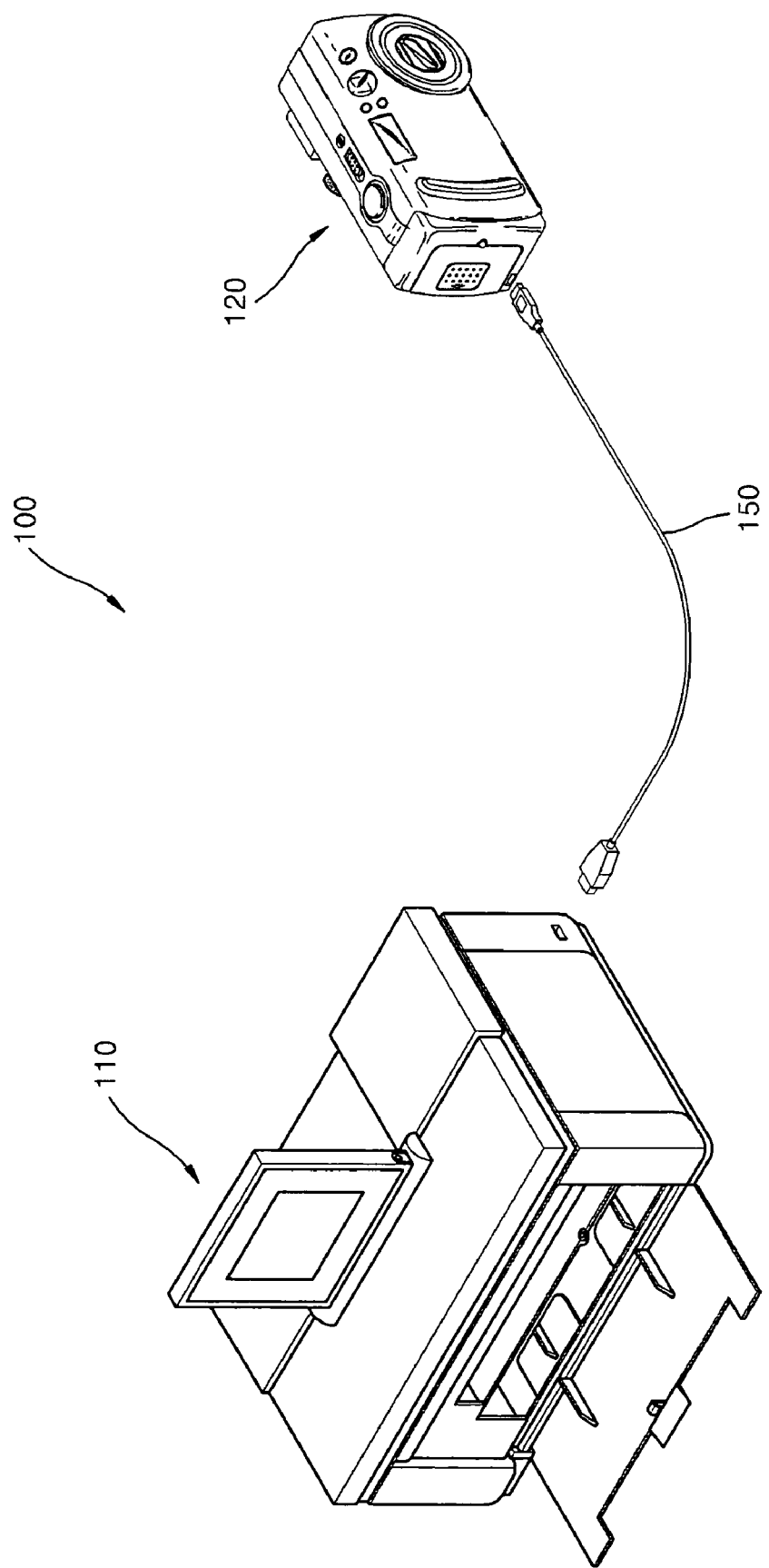
FIG. 1 is a perspective view of an example of a photo printing system according to an embodiment of the present invention.

As illustrated in FIG. 1, an example of a photo printing system 100 according to an embodiment of the present invention includes a photo printer 110 as an output device, and a digital camera 120 as an image storage device storing images to be printed. For communication with each other, the photo printer 110 and the digital camera 120 are connected to each other through a communication link 150 such as a universal serial bus (USB) cable. In this case, since wireless connection such as Bluetooth, Wi-Fi™, and wireless local area network (LAN) can also be considered for the connection between the photo printer 110 and the digital camera 120, the separate communication link 150 may be unnecessary. Meanwhile, the communication link 150 may be formed as a communication network such as the Internet, and the photo printer 110 and the digital camera 120 can transmit and receive predetermined data through the communication network.

Figure 2:
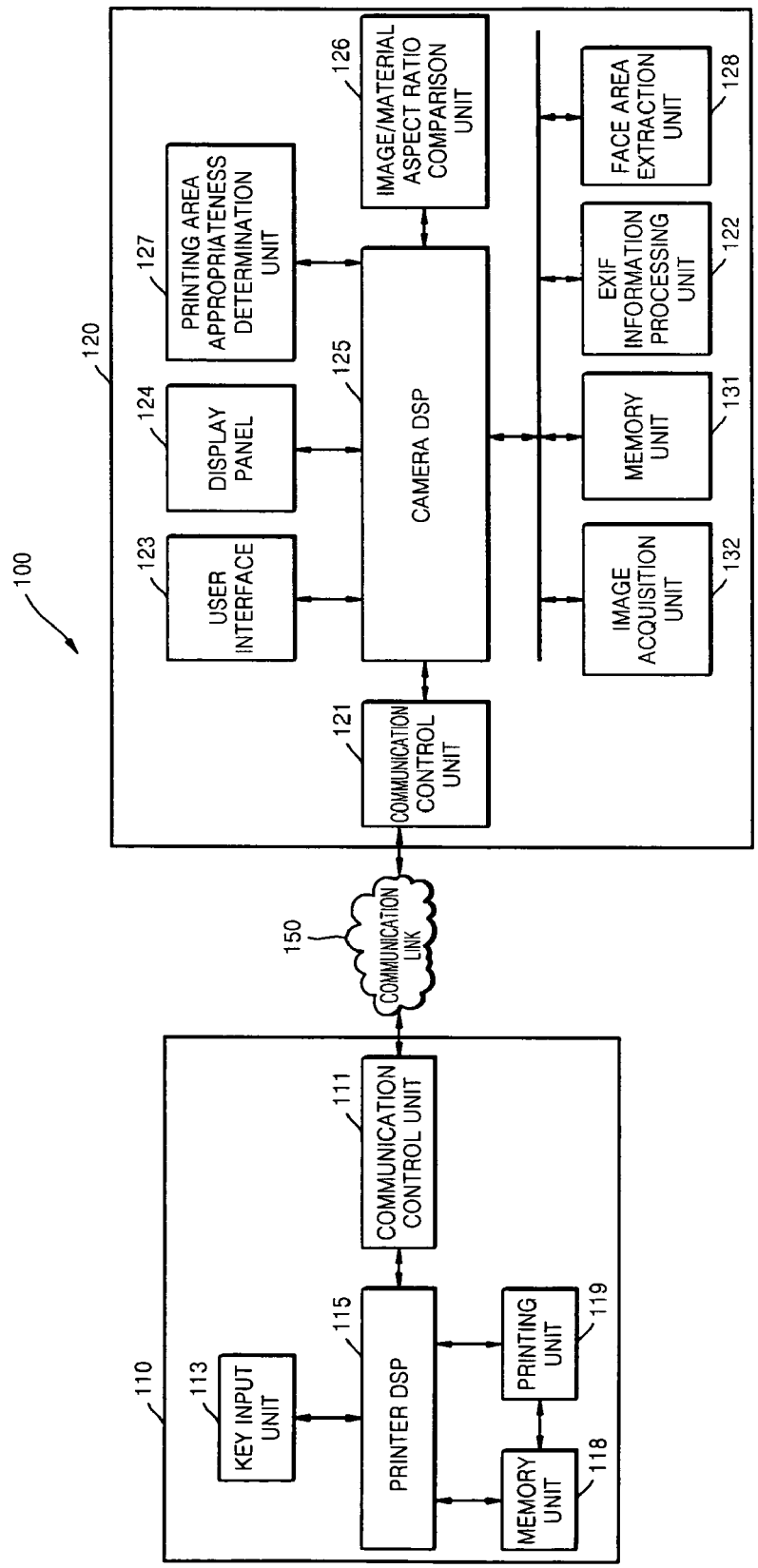
FIG. 2 is a block diagram illustrating an example of functional structure of the photo printing system illustrated in FIG. 1 according to an embodiment of the present invention.

FIG. 2 is a block diagram illustrating an example of a functional structure of the photo printer 110 and the digital camera 120 illustrated in FIG. 1 according to an embodiment of the present invention. Referring to FIG. 2, the photo printer 110 basically includes a communication control unit 111, a memory unit 118, a printing unit 119, and a printer digital signal processor (DSP) 115 for entirely controlling these units.

The communication control unit 111 is a communication interface connected with the digital camera 120 and mediates transmission and reception of control commands between the photo printer 110 and the digital camera 120, and transferring of image data which is selected as an image to be printed. The communication control unit 111 can provide a USB port or a card reader port, and the communication control unit 111 may include a USB device controller for USB connection and/or a wireless communication module for wireless communication.

The memory unit 118 temporarily stores printing data which is received from the digital camera 120, and according to a printing progress, the memory unit 118 transfers the printing data stored therein to the printing unit 119, thereby performing a buffering role.

The printing unit 119 performs a reserved printing job existing in the memory unit 118 according to a print command. The printing unit 119 may be implemented as a thermal transfer image forming mechanism which expresses a predetermined image by selectively heating coloring materials on a printing material, or an electronic image forming mechanism which uses an electric potential difference of an electrostatic latent image formed on a photoconductive drum, or an inkjet image forming mechanism which ejects ink droplets on a printing material, or by using other mechanisms. The key input unit 113 generates a predetermined command according to manipulation by a user and transfers the command to the printer DSP 115. The key input unit 113 may include a power button for turning on or off power, a printing stop key for stopping a printing job, and a setting mode switching key for setting printing conditions.

Meanwhile, the digital camera 120 includes a communication control unit 121 as a communication interface connected with the photo printer 110, a user interface 123 as a user input unit and a display panel 124 as an input/output device, a memory unit 131 storing an image, an Exif information processing unit 122 extracting appendant information included in the image, a face area extraction unit 128 extracting an area in which the face of a person is photographed, from within the image, a printing area appropriateness determination unit 127 determining whether or not the face area is cut off, an image/material aspect ratio comparison unit 126 providing a reference on how to reset a printing area, and a camera digital signal processor (DSP) 125 for entirely controlling these units. In addition, the digital camera 120 has an image acquisition unit 132, including an optical unit (OPC) formed with a plurality of optical lenses, a photoelectric conversion unit such as a charge coupled device (CCD), or a complementary metal-oxide-semiconductor (CMOS), an analog-digital converter (ADC), and a signal processing circuit, so as to process a signal output from the optical unit (OPC) to obtain digital image data.

The camera DSP 125 performs overall control over a photo printing procedure. More specifically, the camera DSP 125 displays an image stored in the memory unit 131 on a screen, thereby guiding an input from a user for selecting an image to be printed. Then, the camera DSP 125 converts the image to be printed into printing data of a data format that can be recognized by the photo printer 110, and transmits the printing data to the photo printer 110. In particular, the camera DSP 125 performs a series of processes for adjusting a printing area under a predetermined condition so that the image can be printed without all or part of a face image captured on an image being cut off. In other words, when a Paper-full print option for leaving no space on a printing material is selected, it is highly probable that the image might be printed with all or part of a face image being cut off. For this reason, the camera DSP 125 recognizes a face image captured on an image and moves the printing area of the image so that the recognized face image can be included.

The face area extraction unit 128 extracts an area in which the face of a person is photographed, from the input image, by performing a face recognition algorithm, and provides position information on the extracted face area to the camera DSP 125. For example, by using low pass filtering for removing high frequency noise components from the input image, color space conversion for converting RGB color information to the YCrCb space, and illuminance calibration for offsetting the difference of face recognition rates with respect to changes in an illumination environment, the face area extraction unit 128 performs preprocessing for increasing a recognition rate to convert an input image to an image from which a face can be easily extracted. Then, edge information is extracted from the thus preprocessed image and a face recognition technique is applied to the edge information, thereby detecting characteristic elements, including the contour line of a face, the eyes, the nose, and the mouth. From the detected characteristic elements, a face area is detected. The face area thus detected in the face area extraction unit 128 can be displayed by being surrounded by a rectangular frame on an image.

The printing area appropriateness determination unit 127 determines whether or not the face area extracted from the image is inside a printing area which is initially set, and then, outputs the determination result to the camera DSP 125, thereby allowing the camera DSP 125 to determine whether or not to adjust the printing area. That is, if it is determined that the recognized face area is outside the printing area, the camera DSP 125 begins an adjusting job for the printing area. The printing area is adjusted according to the output of an image/material aspect ratio comparison unit 126. The image/material aspect ratio comparison unit 126 examines the relationship between the screen aspect ratio (the aspect ratio of width:height) of an image and the standard size (the aspect ratio of width:height) of a printing material, and outputs the result to the camera DSP 125. The output data provides an important reference on how the camera DSP 125 adjusts a printing area on the image, which will be explained later in detail.

Meanwhile, image data in a JPEG format stored in the memory unit 131 includes Exif header information. The Exif information may include color space information such as brightness, saturation, or color etc., and photographing information on a photographed date, on whether or not a flash operates, or on the size of an image. In particular, face recognition information may be recorded as one item of the Exif information in relation to the present invention. By utilizing the recorded face recognition information, although additional image processing is not performed, the position and size of a face area can be accurately recognized. In other words, when the Exif information processing unit 122 operates to read Exif information, to extract information on whether or not the face area exists and on the position or size of the face image and to output the information to the camera DSP 125, the camera DSP 125 may set an appropriate printing area so that the face image cannot be cut off. Meanwhile, the user interface 123 may include a plurality of manipulation buttons, including a mode selection key for switching a mode of the digital camera 120, a 4-direction function key for commanding a display area or a cursor to move, or a printing area to move, and a selection-confirmation key for selecting a menu item indicated by an activated cursor.

Figure 3:
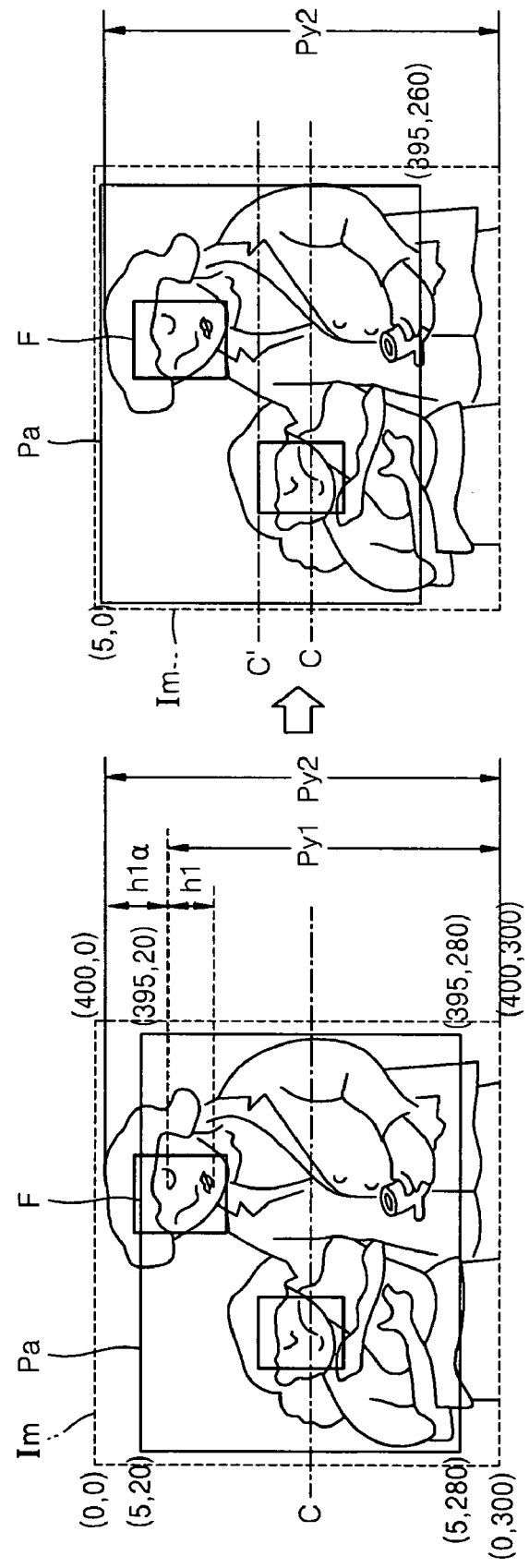
FIGS. 3 and 4 are diagrams illustrating examples of different methods of setting a printing area according to the relationship between the aspect ratio of an image and the aspect ratio of a printing material according to an embodiment of the present invention.
Figure 4:
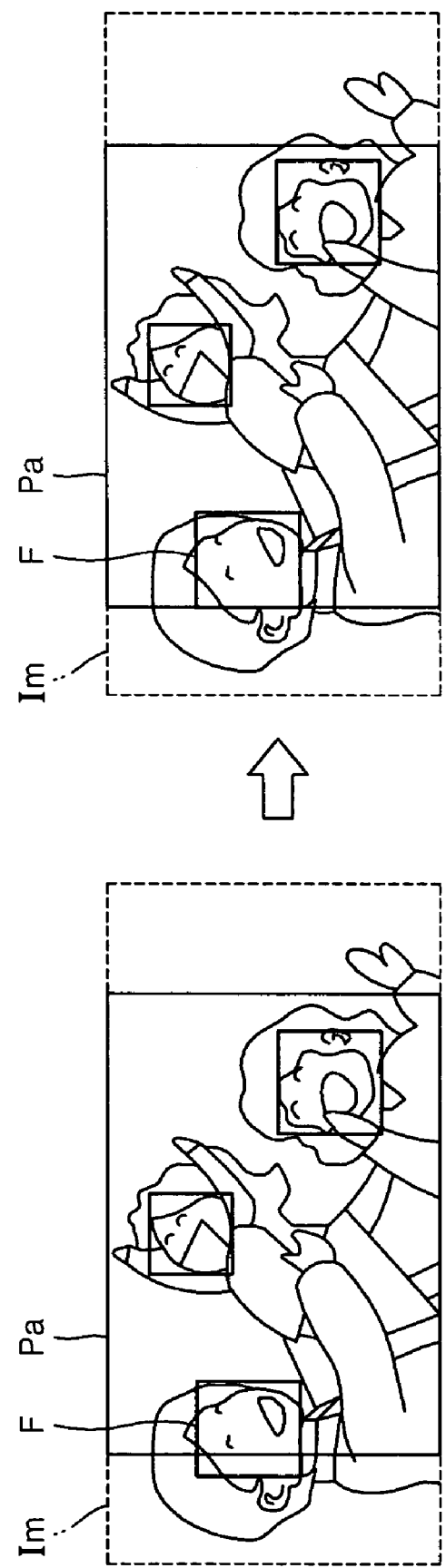

A method of printing an image according to an embodiment of the present invention will now be explained. First, technological principles applied to the present invention will be explained. FIGS. 3 and 4 are diagrams illustrating examples of arrangements of images (Im) transferred on a printing material (Pa) in a Paper-full print option. Between the two figures, FIG. 3 illustrates a case where the screen aspect ratio (for example, 4:3) of the image (Im) is less than the aspect ratio (for example, 3:2) of the printing material (Pa) when the screen aspect ratio (width:height) of the image (Im) and the aspect ratio (width:height) of the standard of the printing material (Pa) are compared. As illustrated in FIG. 3, in the conventional printing method in which the central lines (C) of the image (Im) and the printing material (Pa) are arranged on the same line, the top part of the image (Im) is outside the printing material (Pa), and when printing, the top part of the image of the person is cut off. This is the result according to the ordinary printing procedure in which the central positions of the image (Im) and the printing material (Pa) are placed on the same line. By moving the printing material (Pa) upwards in relation to the image (Im), printing of the whole image of the person is enabled. In this case, in relation to the adjustment range of the printing material (Pa), the degree of adjustment can be determined by referring to the vertical distance (h1) between predetermined characteristic elements obtained in the face area (F) expressed as a rectangular frame. For example, the printing material (Pa) is moved upwards (that is, the central line of the printing material (Pa) is moved from C to C') so that the top end of the printing material (Pa) coincides with a second vertical height (Py2) obtained from equation 1 below with a first vertical height (Py1) of the eye area, the distance (h1) between the eye area and the mouth area, and a weight (α):

$$Py2=Py1+h1\times\alpha \qquad (1)$$

When the vertical distance between the eyes and the mouth is the same as the vertical distance between the eyes and the top of the head, the weight (α) may be set as 1 by considering an ordinary face shape.

Once an appropriate printing area (which corresponds to the printing material (Pa)) is set so that the face area (F) cannot be cut off, a portion of the entire image outside the printing area is trimmed, and only the printing area is extracted and is transferred to the photo printer 110 such that a printing job begins. When the printing area has been set as illustrated in FIGS. 3 and 4, only a portion related to the printing area that can be defined as a starting point (5,0) and an ending point (395,260) along a diagonal direction of a screen may be extracted and may be transferred to the photo printer 110. Alternatively, data on the entire image may be transmitted, and area information on the printing area may be transferred to the photo printer 110. In this regard, the area information on the printing area may include coordinate values (pX,pY,pW,pH)=(5,0,390,260) with a starting point (pX, pY) of the printing area and with width and height (pW,pH) of the printing area based on the starting point (pX,pY).

Meanwhile, FIG. 4 illustrates an example of a case where the screen aspect ratio (for example, 16:9) of the image (Im) is greater than the aspect ratio (for example, 3:2) of the printing material (Pa) when the screen aspect ratio (width:height) of the image (Im) and the aspect ratio (width:height) of the standard of the printing material (Pa) are compared. When Paper-full printing is selected, the left and/or right side of the image (Im) is outside the printing material (Pa) and cut off. In this case, by moving the printing material (Pa) to the left or to the right, printing of the whole image of the person is enabled. More specifically, it is determined whether or not the face area (F) expressed as a rectangular frame is inside the printing material (Pa), and if only any one side of the left part and right part of the face area (F) is cut off, the printing material (Pa) can be moved to the left or right. If both the left and right sides of the face area (F) are cut off, the moving of the printing material (Pa) cannot be performed automatically according to a process which is input in advance. In this case, a warning message is output to a user, and simultaneously, an area which is excluded from the printing is displayed. By doing so, the printing procedure can be performed with an input from the user.

Meanwhile, according to an example of the present invention, an image to be printed is image-processed to extract a face area, and when face recognition information is recorded as Exif information appendant to image data to be printed, the information is read, thereby accurately identifying the location of a face existing in the image. In other words, the image processing for extracting a face area is not necessary. As illustrated in FIG. 5, an example of image data in a JPEG format may have a data structure, including an Exif header area (Exif), a thumbnail image data area (Thumbnail Image Data), an original image data area (Original Image Data), and a screennail image data area (Screennail Image Data). Here, in the Exif header area, attribute information of each image may be recorded. In particular, in the present invention, face recognition information may be recorded.

FIG. 6 exemplifies each data item recorded in the face recognition information of Exif and data values stored in the data item. A "Face_Num" item indicates the number of faces photographed in each image. A "Face_Start_Pt" item indicates the position of the start point of a face in coordinates on a screen plane, and (X1,Y1) or (X2,Y2) indicates a combination of a horizontal coordinate value and a vertical coordinate value corresponding to each start point in the screen coordinates system based on pixel arrangements. A "Face_Size" item indicates the size of a face area, and (A1,B1) or (A2,B2) indicates a combination of a horizontal length and a vertical length calculated from the start point of each face. Also, items "Face_Name", "Face_Mobile_Num", and "Face_Email_Addr" indicate items of details corresponding to the name, mobile phone number, and email address, respectively, of a person whose face is photographed.

FIG. 7 schematically illustrates an example of the detail of communication between the photo printer 110 and the digital camera 120 that cooperate for printing of an image, according to an embodiment of the present invention. First, a connection operation between the photo printer 110 and the digital camera 120 is performed, and transmission control information is exchanged, and communication settings are initialized. Next, the digital camera 120 that senses a request to print from a user, requests information on various printing options supported by the photo printer 110. The information on printing options may include the size (ex. A3, A4, A5) of a printing material supported by the corresponding photo printer 110, the type (ex. plain paper, photo paper) of a printing material, and matters on so-called 2-up, 3-up etc. in which a printing material of 1 page is divided into 2 or 3 parts and is utilized as the printing quantity of several pages. The digital camera 120 that obtains option information of the photo printer 110 displays the obtained information on a display panel, thereby guiding user's selection on the printing options. In this case, options that can be selected by the user are limited to the range supported by the photo printer 110, include the size of a printing material and the type of a printing material etc. In particular, the digital camera 120 displays an option menu on Image-full printing or Paper-full printing in relation to the present invention, thereby guiding option selection.

Then, the digital camera 110 can call a plurality of images stored in the memory unit 131 according to user's input and can display the images in the form of a reduced image on the display panel 124. The user can inquire the images and can set all or part of the images as an image to be printed. When the setting on an image to be printed is completed, the digital camera 120 sets an appropriate printing area so that a face image cannot be cut off from the image to be printed. More specifically, in Image-full printing, cutoff of the face image need not to be considered according to the printing options selected by the user and thus, the printing area is set so that the centers of the image and the printing area coincide with each other according to general methods. In addition, when Paper-full printing is selected but the sizes of the image and the printing material coincide with each other, cutoff of the face image need not to be considered, and the printing area is set according to general methods. However, when Paper-full printing is selected and simultaneously, the sizes of the image to be printed and the size of the currently-set printing material do not coincide with each other, the digital camera 120 performs face recognition processing for extracting a face area from the image and sets an appropriate printing area including the extracted face area. For example, the digital camera 120 may synthesize the printing area that is set in addition to the image to be printed, with a dotted line etc., and may display the synthesized printing area on the screen and may request user's approval. In addition, the digital camera 120 that senses a user's final printing command may extract only part of the image set to the printing area and may transfer printing data in which a portion outside the printing area is trimmed, to the photo printer 110, or may transmit all of the image as printing data appendant to information on the printing area. In this case, information on the printing area may include coordinate values (pX,pY,pW,pH) with a starting point (pX,pY) of the printing area and with width and height (pW,pH) of the printing area based on the staring point (pX, pY). Finally, the photo printer 110 that obtains printing data from the digital camera 120 may perform a printing operation according to the obtained data or by referring to appendant information on the printing area.

Figure 8:
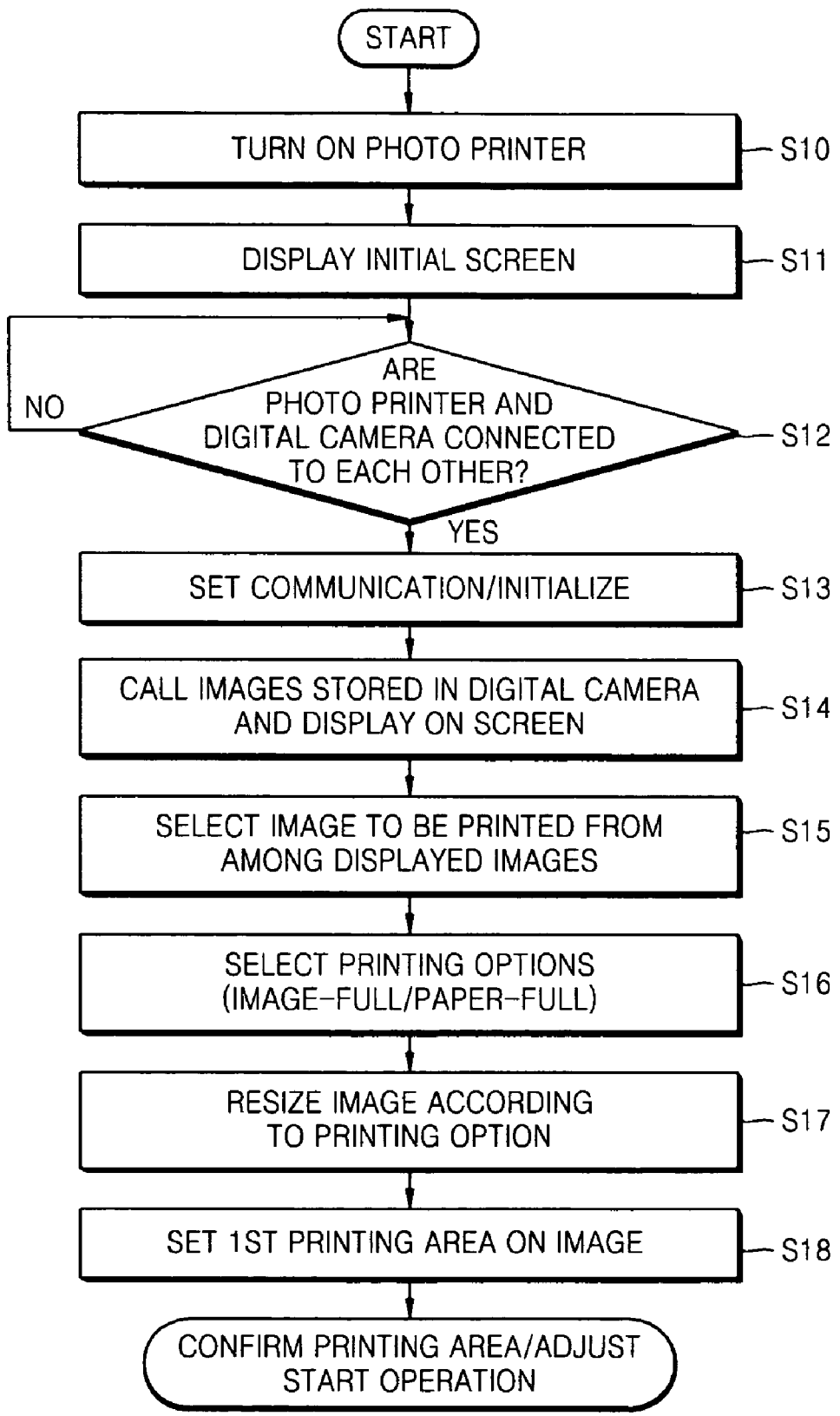
FIGS. 8 through 10 are flowcharts illustrating an example of a method of printing an image according to an embodiment of the present invention.

FIG. 8 is a flowchart illustrating an example of a method of printing an image according to an embodiment of the present invention, and illustrates an algorithm performed mainly by the camera DSP 125 in a printing system including the photo printer 110 as an output device and the digital camera 120 as an image storage device. First, if power for operation is provided to the photo printer 110 in operation S10, the printer DSP 115 may perform initialization and may output an initial screen displaying an operation state of the photo printer 110, on a display window in operation S11. Next, if access of the digital camera 120 to the photo printer 110 is sensed in operation S12, the printer DSP 115 exchanges transmission control information with the digital camera 120, and initializes communication settings in operation S13.

Meanwhile, before or after the connection to the photo printer 110, the digital camera 120 connected to the photo printer 110 enters into a printing mode and may receive user's selection on the image to be printed among from a plurality of images stored in the memory unit 131. In other words, the digital camera 120 can call images stored in the memory unit 131 and can display the images in thumbnail formats on the display panel 124 in operation S14 and can move an activated cursor along a plurality of images displayed on the display panel 124 according to user's manipulation to guide user's selection. If a signal indicating a selection of an image to be printed is input in operation S15, the camera DSP 125 prepares to transmit image data of the image to the photo printer 110.

Next, the camera DSP 125 displays an option menu on Image-full printing or Paper-full printing on a menu screen and receives user's selection in operation S16. If a user's selected option is Paper-full printing and the size of a printing material (A3, A4, A5 etc.) and the size of an image to be printed do not coincide with each other, the camera DSP 125 maintains the aspect ratio (the aspect ratio of width:height) of the image and resizes a corresponding image according to the size of the printing material in operation S17. In this case, an initial printing area is set so that the centers of the image and the printing area can be arranged at the same position in operation S18.

Figure 9:
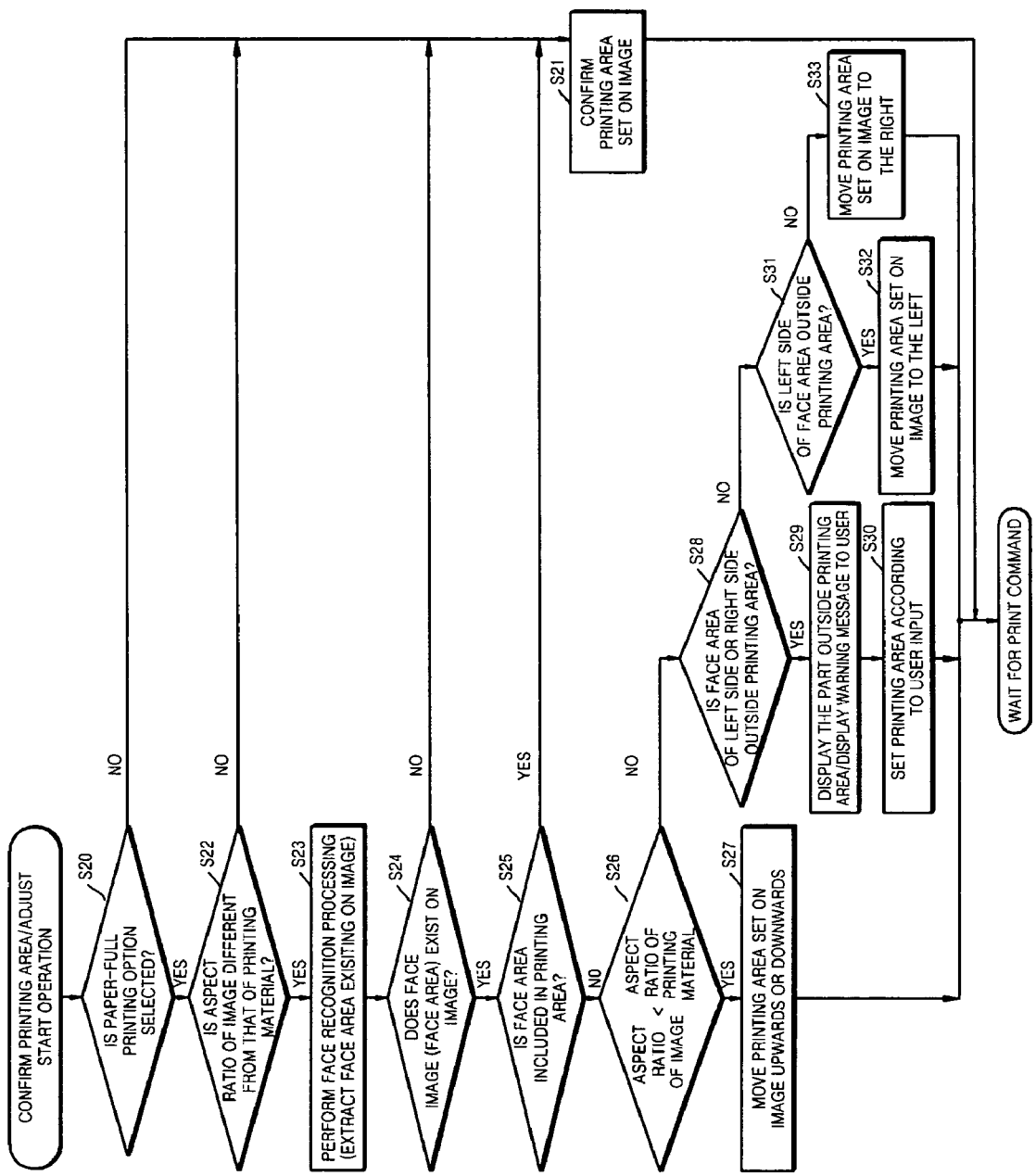

FIG. 9 is a flowchart illustrating examples of operations for confirming or adjusting the printing area which is temporarily set on the image. First, the camera DSP 125 checks a selected printing option in operation S20 and performs a different procedure according to the result of checking. That is, if an Image-full printing option is selected, cutoff of a face area need not to be considered and thus, according to operation S21, the printing area initially set is confirmed, and then, if a final printing command from the user is input, the printing job according to the command is performed.

If the Paper-full printing option is selected, the camera DSP 125 compares the screen aspect ratio (the aspect ratio of width:height, hereinafter referred to as an aspect ratio) of the image, with the aspect ratio of the printing material in operation S22. If the comparison result indicates that the Paper-full printing option is selected but the ratios of the image and the printing material in fact match with each other, cutoff of the face area need not to be considered, and thus, according to operation S21, the printing area initially set is confirmed, and then, if a final printing command from the user is input, the printing job according to the command is performed. However, if the Paper-full printing option is selected and the aspect ratio of the image is different from that of the printing material, for example, if the aspect ratio of the image to be printed is 4:3 and the aspect ratio of the printing material is 3:2, face recognition processing as explained below begins in operation S23.

Face Recognition Processing (S23)

First, the camera DSP 125 operates the Exif information processing unit 122, thereby extracting face recognition information from the Exif header of the image data. For example, the Exif information processing unit 122 extracts data related to a face area from the face recognition information, for example, the coordinate values (X1,Y1,A1,B1) of the start point, the horizontal length and vertical length of a face area, and outputs the data to the camera DSP 125. The coordinate values (X1,Y1,A1,B1) may be based on X and Y coordinates on a screen based on pixel arrangements. The coordinates (X1,Y1) indicate the start point position of the face area, and the coordinates (A1,B1) indicate values corresponding to the width and height of the face area calculated from the start point (X1,Y1).

If face recognition information is not recorded in the Exif header, for example, if the coordinate values (X1,Y1,A1,B1)= (0,0,0,0) (a NULL state in which no input of coordinate values exists) obtained from the Exif information processing unit 122, the camera DSP 125 transfers the image to the face area extraction unit 128. The face area extraction unit 128 which receives the image data performs preprocessing and extracts edge elements based on the distribution of a luminance signal appearing on the preprocessed image. Next, by applying a face recognition technique to the thus extracted edge image, characteristic elements of a face, such as the contour, eyes, nose, and mouth of the face are detected. According to the detected characteristic elements, the face area is detected. For example, in the face recognition technique, by comparing the extracted edge image with a model based on shape studies, the characteristic elements of the face can be detected, and according to the detected results (for example, according to whether or not the eyes and mouth areas are obtained), it is determined whether or not the face area is obtained. In this case, a plurality of face areas can also be detected from one screen image. Data can be generated from the set face area, for example, as the coordinate values (X1,Y1,A1,B1) of the start point, horizontal length and vertical length of the face area, and the set face area can be indicated by being surrounded by a rectangular frame on the screen.

As described above, the face recognition might be achieved by extracting face recognition information from the Exif header of the image to be printed, or by performing a face recognition algorithm to extract face area from the image. But the technical scope of the present invention is not limited to the examples as described above, the face recognition could be achieved by the various methods known in the conventional art as well.

Next, if it is determined whether a valid face area is detected in face recognition processing (S23) in operation S24 and the face area is not detected, cutoff of the face area need not to be considered, and thus, according to operation S21, the camera DSP 125 can confirm the printing area initially set and perform the following printing procedures. However, if a valid face area is obtained in face recognition processing (S23), the camera DSP 125 compares the obtained face area with the initially set printing area, thereby examining whether or not the face area is included in the printing area in operation S25. For example, the printing area appropriateness determination unit 127 compares the coordinate values (X1,Y1,A1,B1) of the start point, horizontal length, and vertical length of the face area with the coordinate values (pX, pY,pW,pH) of the start point, horizontal length and vertical length of the printing area and can confirm whether or not the face area is included in the printing area.

According to the examination result, if the face area exists inside the initially set printing area, the printing area is confirmed according to operation S21, and if a user's final printing command is input, a printing job is performed accordingly. However, if it is determined that the face area is not included in the printing area, adjusting of the printing area is performed. First, the camera DSP 125 examines the relationship between the aspect ratio of the image and the aspect ratio of the printing material in operation S26. According to the examination result, the camera DSP 125 adjusts a printing area in a different method in operations S27 to S33 as described below.

Adjusting of Printing Area (S27 to S33)

1) If the aspect ratio of the image is less than the aspect ratio of the printing material, for example, if the aspect ratio of the image is 4:3 and the aspect ratio of the printing material is 3:2, the printing area is moved upwards and downwards to a predetermined extent according to operation S27. In this case, with respect to the moving direction, the printing area is moved upwards and downwards in which the face area outside the printing area exists, and the adjustment range of the printing area can be determined by referring to the distance between characteristic elements obtained in the face area. That is, as described above with reference to FIG. 3, the camera DSP 125 can print the whole image of a person including the face area, by putting the top side of the printing area on a second vertical height (Py2) which is obtained from equation 1 (Py2=Py1+h1×α) from a first vertical height (Py1) of the eye area, the distance (h1) between the eye area and the mouth area, and a weight (α). If the distance between the eyes and the mouth is similar to the distance between the eyes to the top of the head from observation based on shape studies of typical persons, the weight (α) may be set as 1.

2) If the aspect ratio of the image is greater than the aspect ratio of the printing material, for example, if the aspect ratio of the image is 16:9 and the aspect ratio of the printing material is 3:2, according to operation S28, the camera DSP 125 determines whether or not a face exists outside the printing area on the left and right of the image in operation S28. That is, if it is determined that a first face area and a second face area recognized on the image exist on two sides, that is on the left and on the right sides of the image, and both face areas are outside the printing area, the camera DSP 125 cannot arbitrarily adjust the printing area in any one of the left and right directions. Accordingly, with a warning message, the area which is excluded from printing is displayed on the display panel 124 in operation S29. Then, if an input by a user for moving a printing area is sensed (for example, sensing the manipulation of the 4-direction function key), the camera DSP 125 moves the printing area according to the user's input in operation S30, and the following procedures are performed.

However, if the face area exists outside the printing area in any one of the left and right sides, for example, if it is determined that the left side of the face area is outside the printing area in operation S31, the printing area is adjusted, by moving the printing area to the left to include the part of the face area outside the printing area, so that the whole face area can be included in the printing area in operation S32. Also, if it is determined that the right side of the face area is outside the printing area in operation S31, the printing area is adjusted, by moving the printing area to the right to include the part of the face area outside the printing area, so that the whole face area can be included in the printing area in operation S33.

Figure 10:
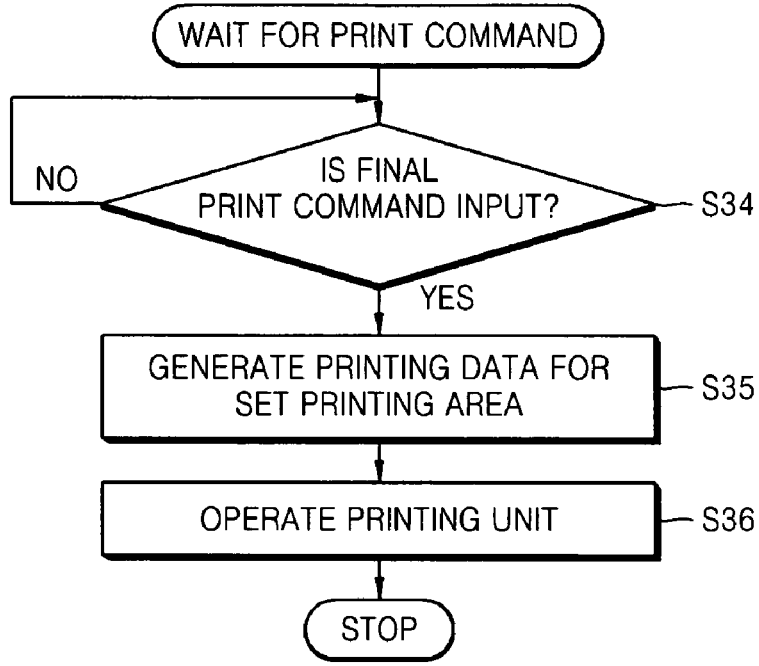

FIG. 10 is a flowchart illustrating an example of a printing operation to be performed after the printing area is confirmed. If the user's final printing command is sensed in operation S34, only part of an image to be printed corresponding to the printing area is extracted and is converted into printing data in a data format that can be recognized by the photo printer 110, and the converted data is transmitted to the photo printer 110 in operation S35. In this case, as data to be transmitted to the photo printer 110, only part of an image corresponding to the set printing area may be extracted and transmitted, or all of the image may also be transmitted appendant to area information specifying the printing area.

Next, as the printing data is received, the printing job of the photo printer 110 begins (S36). More specifically, the printer DSP 115 temporarily stores the printing data received from the digital camera 120 in the memory unit 118, and at the same time outputs a print start signal, thereby operating the printing unit 119 so that the printing data existing in the memory unit 118 can be output on the printing material.

Figure 11:
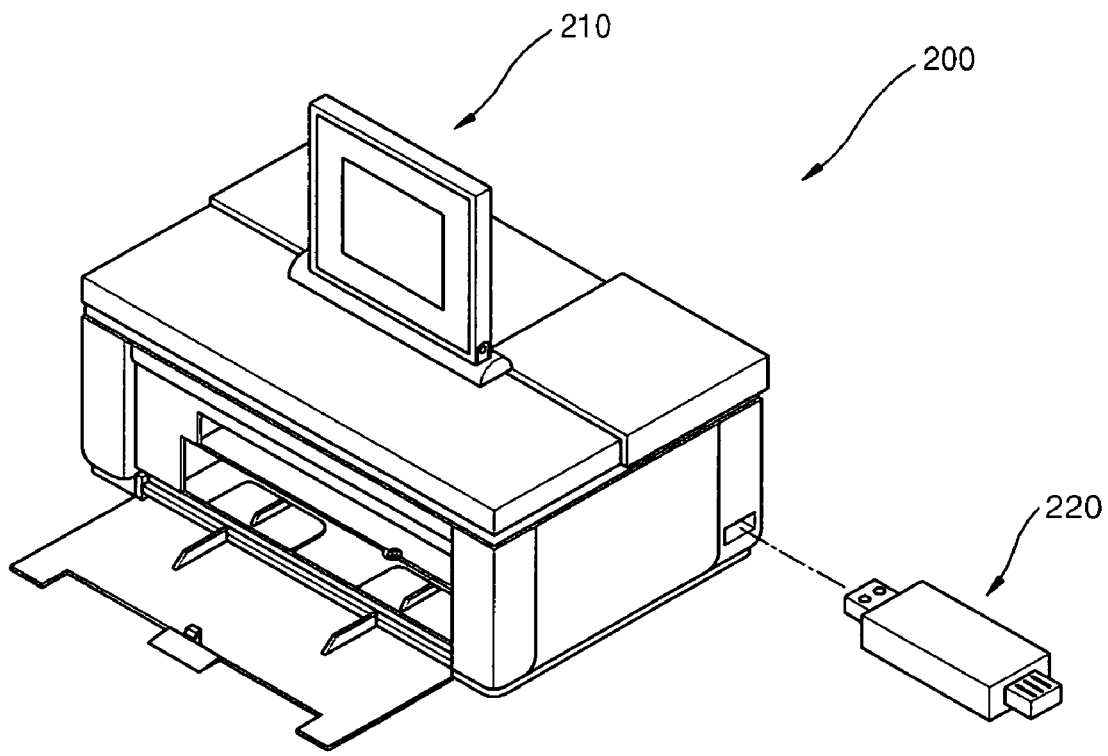
FIG. 11 is a perspective view of an example of a photo printing system according to another embodiment of the present invention.

Meanwhile, the image storage device implemented as the digital camera 120 has the memory function for storing images, its own operation control function (DSP function), and the display function. Examples of the image storage device are a digital camera and a digital TV. However, the technological principle of the present invention can also be applied in fact identically to a case where a small-sized memory device which does not have its own CPU function and display function, such as a detachable memory, is used as the image storage device. A structure of a whole photo printing system according to this application example is illustrated in FIG. 11.

Figure 12:
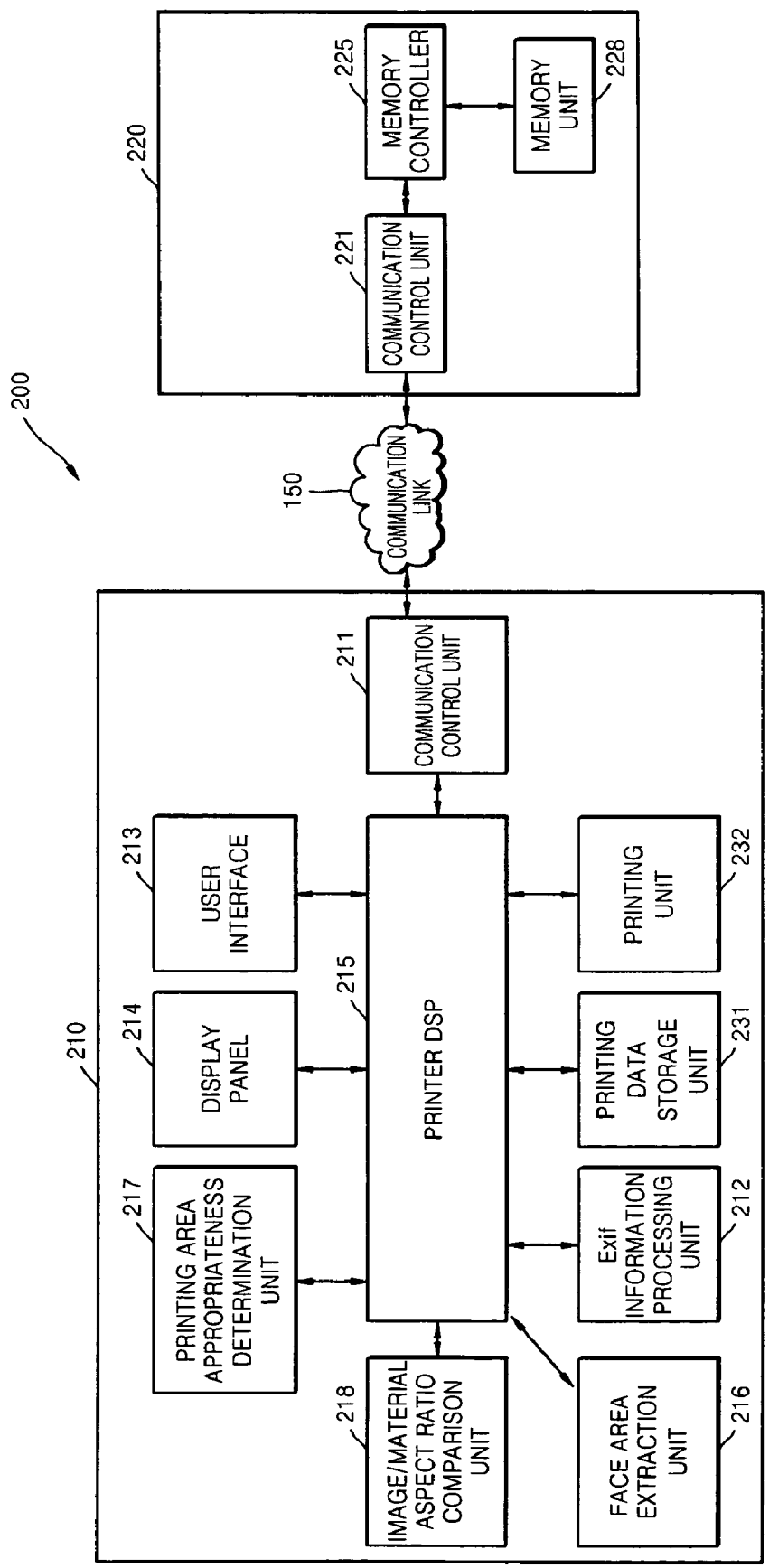
FIG. 12 is a functional block diagram of an example of the photo printing system illustrated in FIG. 11 according to an embodiment of the present invention.

The illustrated photo printing system 200 basically includes a photo printer 210 as a printing output apparatus and a memory device 220 as an image storage device. The photo printer 210 and the memory device 220 may be connected to each other through a communication link such as a USB. FIG. 12 is a block diagram of a functional structure of the photo printer 210 and the memory device 220 illustrated in FIG. 11 according to an embodiment of the present invention. Referring to FIG. 12, the memory device 220 is formed focusing on a function for storing images to be printed, and has a memory controller 225, a memory unit 228, and a communication control unit 221.

The photo printer 210 includes a communication control unit 211, an Exif information processing unit 212, an image/material aspect ratio comparison unit 218, a printing area appropriateness determination unit 217, a face area extraction unit 216, a printing data storage unit 231, a printing unit 232, and a printer DSP 215 for controlling each of these units. The photo printer 210 may include a display panel 214 providing a graphic environment for receiving selection by a user of an image to be printed, by displaying images stored in the memory device 220. Also, the photo printer 210 may have a user interface 213 as a user input unit.

A series of printing processes performed by the photo printing system is the same as illustrated in the examples of FIGS. 8 through 10, but the method according to the current embodiment is different in that most of operations are processed by the printer DSP 215. More specifically, if power for operation is provided to the photo printer 210 in operation S10, the printer DSP 215 performs initialization. Then, if access of the memory device 220 to a communication interface such as a USB port and a card reader, is sensed in operation S12, and the printer DSP 215 initializes a communication setting with the memory device 220 in operation S13. In this case, by displaying a folder icon corresponding to the data memory device 220 on the display panel 214, the printer DSP 215 may display a connection state.

Then, if a signal for selecting the folder icon corresponding to the memory device 220 is input from the user interface 213, the printer DSP 215 calls images stored in the memory device 220 and displays the images on the display panel 214 in operation S15, and thereby receives an input by the user for selecting an image to be printed in operation S15. In addition, the printer DSP 215 displays an option menu for setting printing conditions on the display panel 214 and receives an input by the user for selection for a Image-full printing or Paper-full printing option in operation S16. Further, the printer DSP 215 sets a first printing area so that the center of the printing area is positioned at the center of the image in operation S18.

Next, the printer DSP 215 performs operations for confirming or adjusting a printing area which is temporarily set on the image, as illustrated in FIG. 9. First, the printer DSP 215 checks a selected printing option in operation S20. If the Image-full printing option is selected, cutoff of a face area need not to be considered, and thus, the printing area initially set is confirmed according to operation S21 and operations following therefrom, and the printing job is performed according to a user's final printing command.

If the Paper-full printing option is selected, the printer DSP 215 compares the aspect ratio of the printing material with the aspect ratio of the image to be printed in operation S22. If the Paper-full printing option is selected but the comparison result indicates that the aspect ratios of the image and the printing material match with each other, cutoff of a face area need not to be considered and thus, the printing area initially set is confirmed in operation S21 and a printing job is performed according to a user's final printing command. However, if the Paper-full printing option is selected and the aspect ratio of the image is different from the aspect ratio of the printing material, a face area is detected in operation S23, based on face recognition information obtained from the Exif information processing unit 212 or information obtained from the face area extraction unit 216, then whether or not a face area exists is determined in operation S24, and whether or not the detected face area is included in the printing area initially set is examined in operation S25. According to the examined result, the printing area is confirmed in operation S21 or adjusting of the printing is performed so that the face area cannot be cut off.

In order to adjust the printing area, the printer DSP 215 examines the relationship between the aspect ratio of the image and the aspect ratio of the printing material. If the aspect ratio of the image is less than the aspect ratio of the printing material, the printing area is moved upwards or downwards according to operation S27, and the extent of the movement may be determined according to the calculation result of equation 1. Also, if the aspect ratio of the image is greater than the aspect ratio of the printing material, and both a first face area and a second area existing on the left and right sides are outside the printing area in operation S28, a printing area is set according to selection by the user in operations S29 and S30. Also, if one of the left and right sides of a face area is outside the printing area in operation S28, the printing area is moved to the left side or the right side in operations S32 and S33.

After the printing area is set in order to include a face area, according to a printing command by the user in operation S34, the printer DSP 215 generates printing data for the set printing area in operation S35, and outputs the printing data on the printing material by operating the printing unit 232 in operation S36.

As described above, an output device exemplified as the photo printer 110 and an image storage device exemplified as the digital camera 120 or the memory device 220 constitute a mutual interconnection environment and set the printing area adaptively according to the location of a face area. However, the technical scope of the present invention is not limited to the features of the photo printer 110 and the digital camera 120 but may be applied to various other systems. When an output device having an appropriate structure to printing output and an image storage device having an appropriate structure to store image files are connected to each other to access each other, the technical spirit of the present invention may be applied to be the same as or similar to the previous description.

Figure 13:
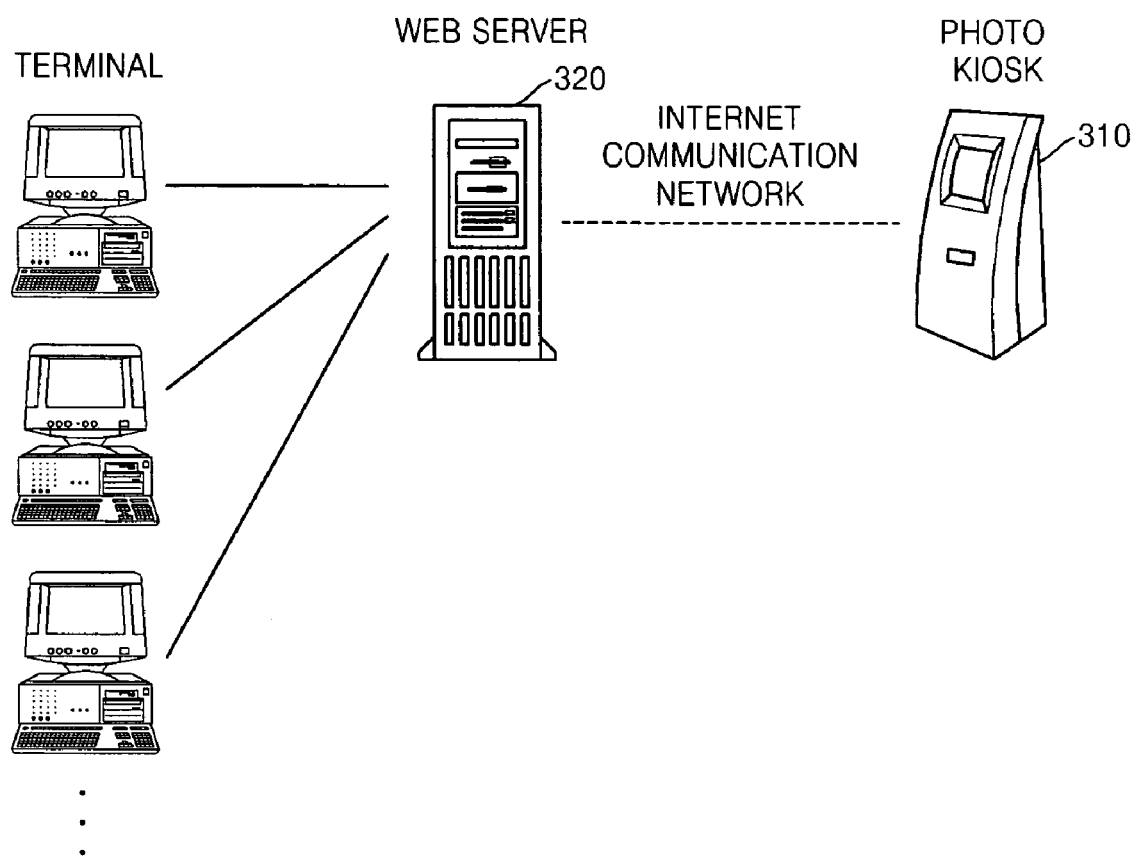
FIG. 13 illustrates an example of a case where a photo kiosk is used as an output device, according to an embodiment of the present invention.

An example for implementing the present invention by using a photo kiosk installed at public places, such as schools, banks, department stores, large-scale marts, airports, and hotels etc., for providing a photo printing service is illustrated in FIG. 13. As illustrated in FIG. 13, a photo kiosk 310 as an output device and a web server 320 as an image storage device are connected to each other to access each other through an Internet communication network. A user who requests printing output accesses to the web server 320 through the photo kiosk 310 to download an image that has been uploaded and stored by himself/herself. The photo kiosk 310 that obtains the image from the web server 320 can operate an embedded image processing algorithm to perform a series of processing such as detecting of a face area from the image and setting of an appropriate printing area so that the detected face area cannot be cut off.

Figure 14:
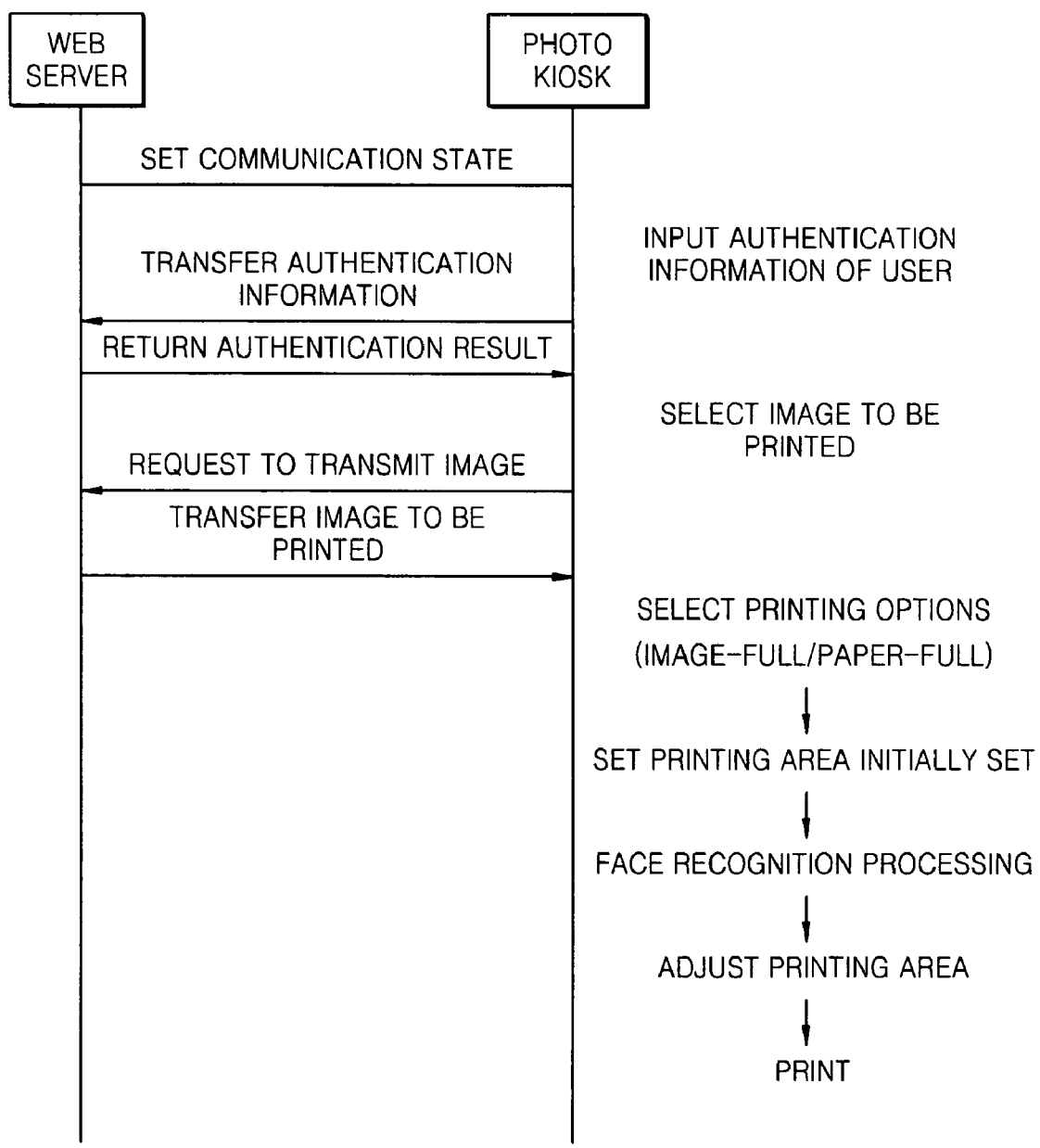
FIGS. 14 and 15 schematically illustrate an example of the detail of communication between the photo kiosk and a web server, which are illustrated in FIG. 13.

FIG. 14 schematically illustrates an example of the detail of communication between a photo kiosk and a web server, which are connected to each other through an Internet communication network. Referring to FIG. 14, the photo kiosk 310 providing a photo printing service accesses to the web server 320 for obtaining image data according to the path that is specified by the user, sets a communication state and then transfers authentication information that is input by the user to the web server 320. Then, the web server 320 checks received authentication information to return the authentication result and allows an authenticated user to access to a server memory. The user can inquire regarding the images that have been uploaded and stored by himself/herself and can select an image to be printed. The photo kiosk 310 can request the web server 320 storing the image of transmission of the image to be printed, and the web server 320 transmits the corresponding stored image according to the request of the photo kiosk 310. The photo kiosk 310 that obtains the image to be printed can receive user's option selection on Image-full printing or Paper-full printing and can set a first printing area so that the center of the image coincides with the center of the printing area. In this case, when the Image-full printing option is selected or the Paper-full printing option is selected but the aspect ratio of the printing material matches with that of the image, cutoff of face need not to be considered and thus, the printing area which is temporarily set on the image is confirmed and a printing job is performed. However, when the Paper-full printing option is selected and the aspect ratio of the printing material is different from that of the image, face recognition processing performed to extract a face area from the image, and whether or not the extracted face area is included in the printing area initially set is examined, thereby moving the printing area initially set up and down and right and left to adjust the printing area and to finally perform the printing job.

Figure 15:
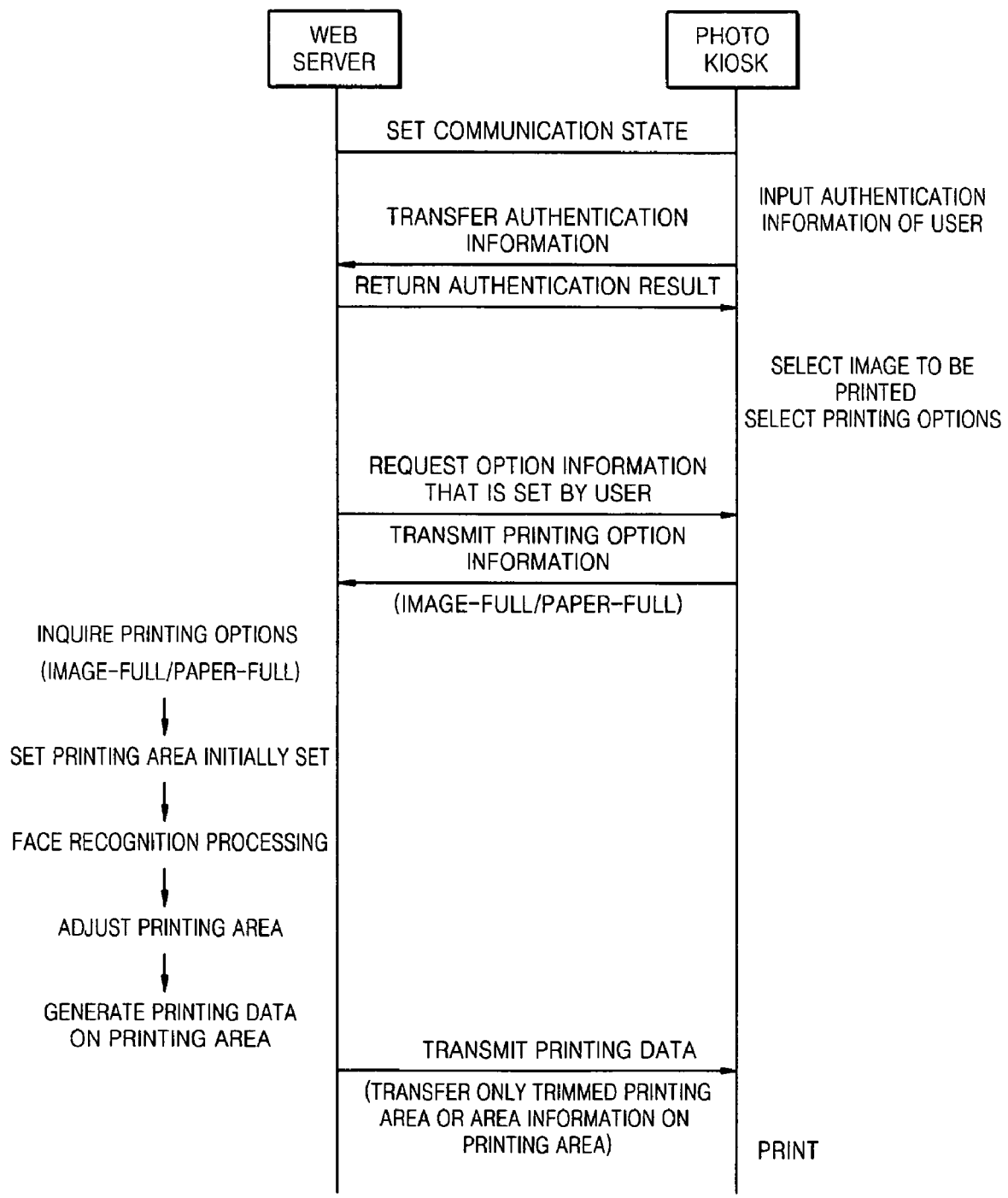

A series of image processing algorithms for detecting the face area from the image and setting the printing area so that the face area cannot be cut off, may be performed by the photo kiosk 310 or by the web server 320 that manages photos uploaded by authenticated members. In case that the series of image processing algorithms are performed by the web server 320, the photo kiosk 310 can perform only an output work on a printing material according to an appropriate printing area that is set by the web server 320, and an example thereof is illustrated in FIG. 15. As illustrated in the example of FIG. 15, the photo kiosk 310 accesses to the web server 320 for obtaining image data according to the path that is specified by the user, sets a communication state, and transfers authentication information that is input by the user to the web server 320. Accordingly, the web server 320 checks the received authentication information to return the authentication result and to allow an authenticated user to access to the server memory. The user can inquire regarding the images that have been uploaded and stored by himself/herself, can set an image to be printed, and can select a printing option on Image-full printing or Paper-full printing. Then, the web server 320 sets an appropriate printing area so that the face area cannot be cut off, according to the set printing option. The web server 320 requests option information (Image-full/Paper-full) that is set by the user. The web server 320 that obtains the option information sets a first printing area on the image so that the center of the image coincides with the center of the printing area. In this case, when the Image-full printing option is selected or the Paper-full printing option is selected but the aspect ratio of a printing material matches with that of the image, cutoff of a face image need not to be considered, and thus, the printing area which is temporarily set on the image is confirmed. However, when the Paper-full printing option is selected and the aspect ratio of the printing material is different from that of the image, face recognition processing is performed to extract a face area from the image, and whether or not the extracted face area is included in the printing area initially set is examined, thereby moving the printing area initially set up and down and right and left to adjust the printing area and to finally perform the printing job.

The web server 320 that confirms the printing area, can generate printing data in which only part of the image to be printed included in the printing area is extracted and a portion outside the printing area is trimmed, to transmit the generated printing data to the photo kiosk 310, or can transmit all of the image appendant to area information specifying the printing area. Finally, the photo kiosk 310 that obtains printing data begins printing output.

Figure 16:
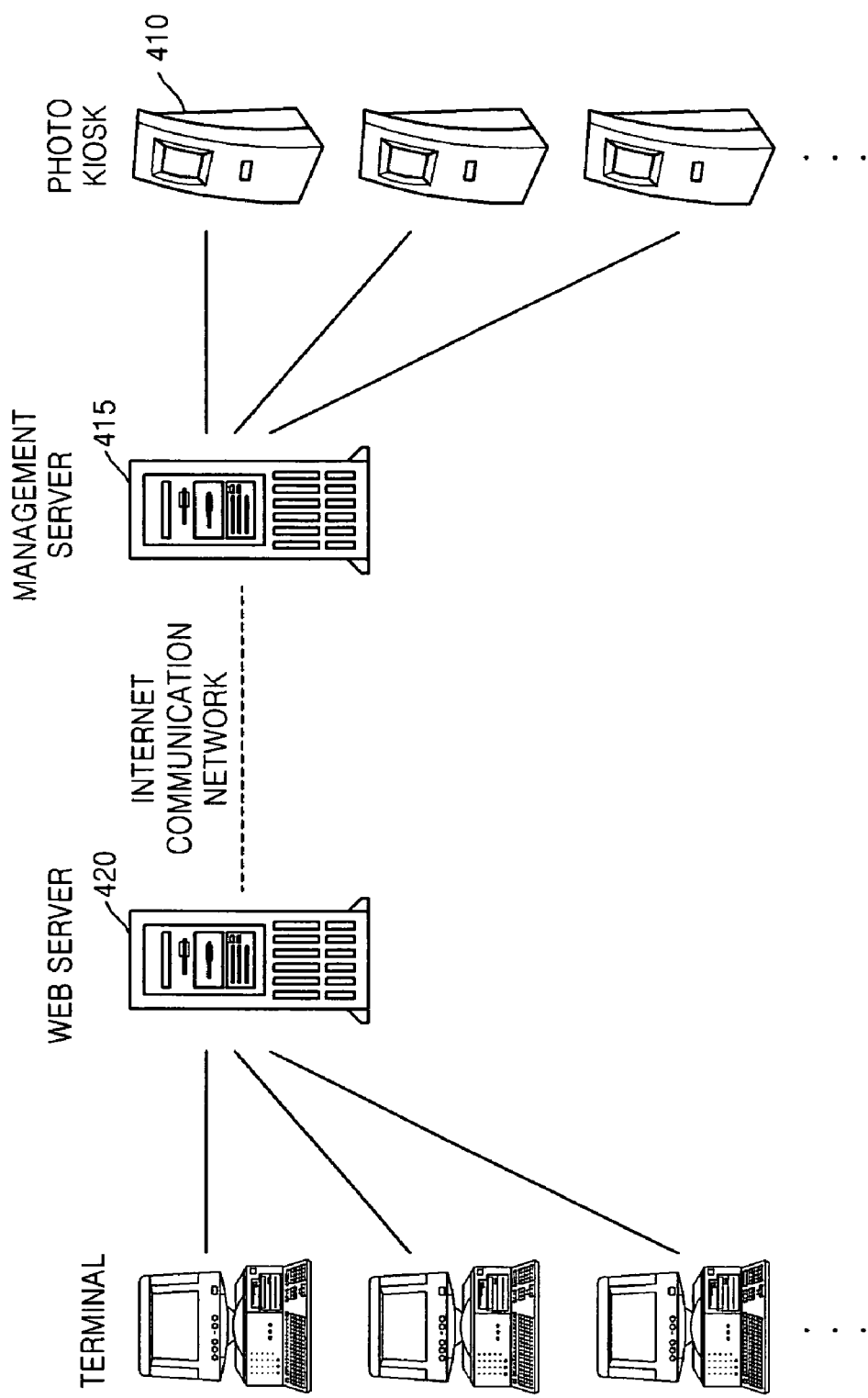
FIGS. 16 through 18 illustrate an example of a case where a photo kiosk is used as an output device, according to another embodiments of the present invention.

Meanwhile, as illustrated in the example of FIG. 16, photo kiosks 410 that are distributively disposed in various public places, are entirely controlled by a management server 415. A user who requests printing output, uses the photo kiosks 410 in a local area as terminals, accesses to the web server 420 connected to an Internet communication network through the management server 415 to download the image that has been uploaded and stored by himself/herself, and the management server 415 that obtains the image operates an image processing algorithm to set an appropriate printing area. The procedure of detecting a face area from an image and setting an appropriate printing area so that the detected face area cannot cut off is the same as described above, and for example, the photo kiosks 410 can perform only an output job by referring to an appropriate printing area that is set by the management server 415.

Figure 17:
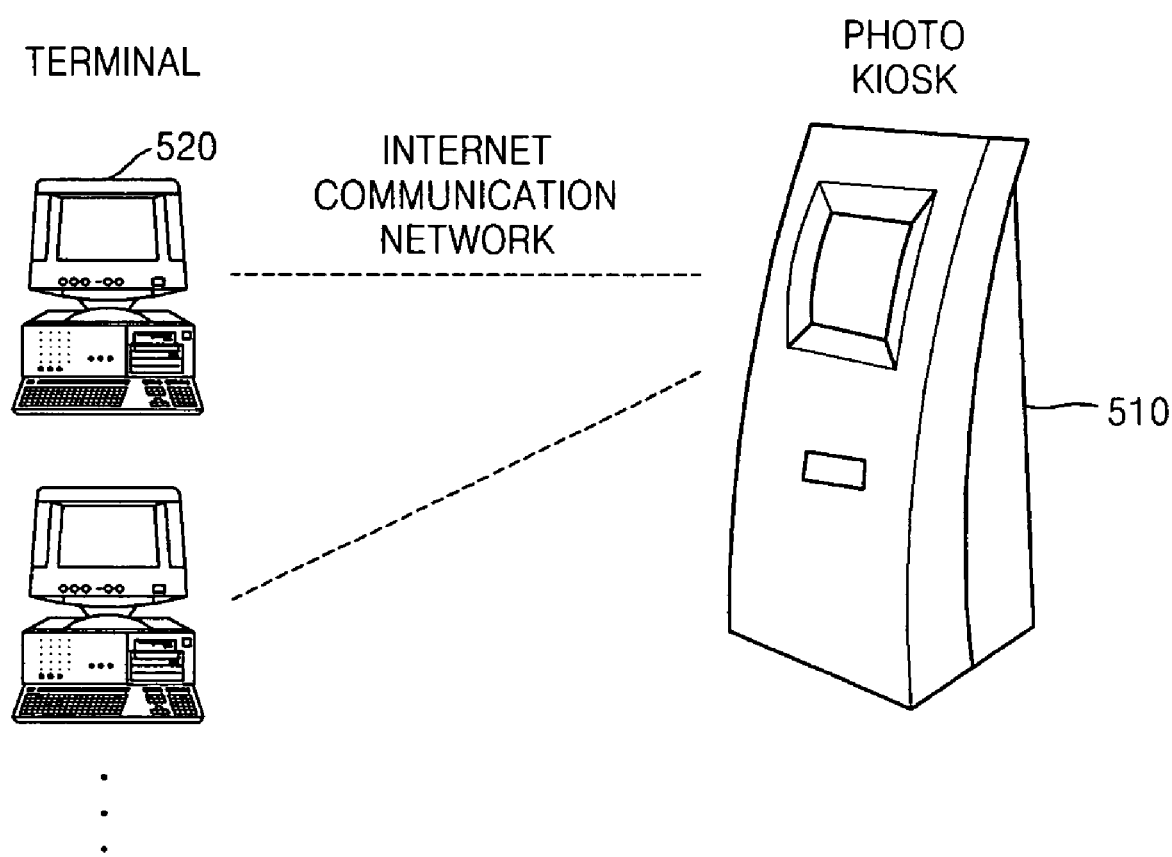

Meanwhile, as illustrated in the example of FIG. 17, a user who requests a printing output can access to his/her own terminal 520 that is located in a remote place by using a photo kiosk 510 that is disposed in a public place, and can transmit the image stored in the terminal 520 to the photo kiosk 510 through an Internet communication network, and the photo kiosk 510 can perform an output job by using the transmitted image as a print target. In such an application, the photo kiosk 510 is an output device, and the terminal 520 of the user is an image storage device, and one of the photo kiosk 510 and the terminal 520 storing the image processing algorithm can set an appropriate printing area in which cutoff of face does not occur, and the photo kiosk 510 can perform a printing job according to the set printing area.

Figure 18:
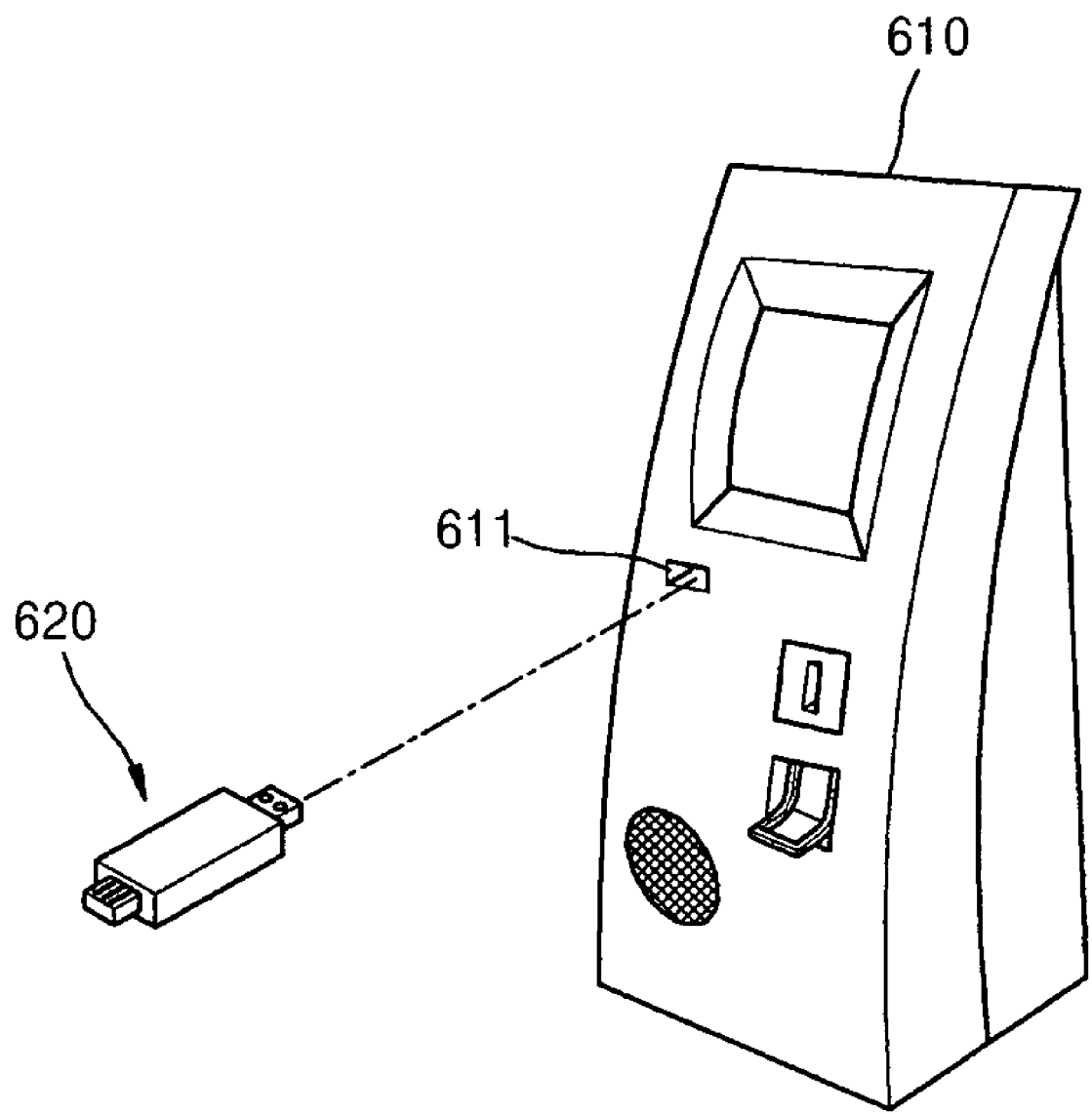

Meanwhile, as illustrated in the example of FIG. 18, a user who requests a printing output can use a photo kiosk 610 as an output device, can allow his/her own detachable memory 620 to access to the photo kiosk 610, and can transmit images stored in the detachable memory 620 to the photo kiosk 610. In such an application, for example, a memory insertion slot 611 is formed in a front portion of the photo kiosk 610, and the detachable memory 620 is inserted in the slot 611, thereby performing the function of an image storage device providing an image to be printed. The photo kiosk 610 that receives the image from the detachable memory 620 can operate an embedded image processing algorithm and can set a printing area in which cutoff of face does not occur.

According the present invention, whether or not to adjust a printing area is examined according to whether or not a face area detected on an image is included in the printing area, and according to specific printing conditions, the printing area is variably set so that a face image that exists on the image can be printed without being cut off due to mismatch between the aspect ratio of the image to be printed and that of the printing material. Accordingly, irrespective of whether or not the aspect ratio of the image to be printed matches with that of the printing material, or printing options, printing of a whole face image is guaranteed.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of outputting through a photo printer an image stored in an image storage device, the method comprising:
    setting a temporary printing area on an image to be printed;
    determining whether or not an option for Paper-full printing is selected;
    if the Paper-full print option is selected, detecting a face area on the image;
    determining whether or not the detected face area is included in a printing area; and
    according to the determination result, adjusting a printing area so that the face area can be included in the printing area, wherein the adjusting of the printing area comprises:
        determining whether or not the aspect ratio of the image and the aspect ratio of the printing material are substantially different from each other; and
        moving the printing area according to the determination result, wherein the moving of the printing area comprises:
            if the aspect ratio of the image is less than the aspect ratio of the printing material, the printing area is moved upwards or downwards;
            if the aspect ratio of the image is greater than the aspect ratio of the printing material, and if a face area in only one of the left and right sides on the image exists outside the printing area, the printing area is moved in a left or right side direction such that the face area is included in the printing area; and
            if the aspect ratio of the image is greater than the aspect ratio of the printing material, and if a first face area and a second face area on the left and right sides of the image exist outside the printing area, an area which is excluded from printing is displayed for a user with a warning message.

2. The method of claim 1, wherein in the moving upwards or downwards of the printing area, the printing area is moved upwards so that the top end of the printing area matches with a second vertical height ($Py2$) obtained from a first vertical height ($Py1$) of the eye area in the face area detected from the image, the distance ($h1$) between the eye area and the mouth area, and a weight ($\alpha$),
wherein $$Py2 = Py1 + h1 \times \alpha.$$

3. The method of claim 1, wherein in the moving of the printing area to the left or right, the printing area is moved to the side where the face area exists outside the printing area.

4. The method of claim 1, wherein in the displaying of the warning message to the user, a printing area is set according to an input by the user.

5. The method of claim 1, wherein in the detecting of a face area, information on the position of a face area is extracted and read from Exif information appendant to the image.

6. The method of claim 1, wherein in the detecting of a face area, the face area is extracted through image processing.

* * * * *